US005459502A

United States Patent [19]

Sakaki et al.

[11] Patent Number: 5,459,502

[45] Date of Patent: Oct. 17, 1995

[54] COLOR INK JET RECORDING METHOD

[75] Inventors: Mamoru Sakaki, Sagamihara; Tomomi Nakatsugawa, Kawasaki; Yutaka Kurabayashi, Yokohama, all of Japan

[73] Assignee: Canon Kabushiki Kaisha, Tokyo, Japan

[21] Appl. No.: 120,851

[22] Filed: Sep. 15, 1993

Related U.S. Application Data

[63] Continuation of Ser. No. 645,475, Jan. 24, 1991, abandoned.

[30] Foreign Application Priority Data

Jan. 24, 1990 [JP] Japan .................................... 2-012455

[51] Int. Cl.[6] .............................. C09D 11/02; B41J 3/407

[52] U.S. Cl. ............................................. 347/100; 347/106

[58] Field of Search ..................................... 347/100, 105, 347/106, 135.1; 358/501, 502, 515, 518, 520

[56] References Cited

U.S. PATENT DOCUMENTS

| | | | |
|---|---|---|---|
| 4,474,847 | 10/1984 | Schroder et al. | 428/323 |
| 4,478,910 | 10/1984 | Oshima et al. | 428/331 |
| 4,540,996 | 9/1985 | Saito | 346/140 R |
| 4,547,786 | 10/1985 | Logan et al. | 346/140 R |
| 4,723,129 | 2/1988 | Endo et al. | 346/1.1 |
| 4,931,810 | 6/1990 | Iwata et al. | 346/1.1 |
| 4,943,813 | 7/1990 | Palmer et al. | 346/1.1 |
| 4,965,612 | 10/1990 | Sakaki et al. | 346/1.1 |
| 5,137,778 | 8/1992 | Nakatsugawa et al. | 346/1.1 X |
| 5,140,339 | 8/1992 | Higuma et al. | 346/1.1 |
| 5,223,026 | 6/1993 | Schwarz, Jr. | 346/1.1 X |

FOREIGN PATENT DOCUMENTS

| | | | |
|---|---|---|---|
| 0436230 | 7/1991 | European Pat. Off. | B41M 5/00 |
| 2485578 | 12/1981 | France | D21H 1/28 |
| 54-59936 | 5/1979 | Japan . | |
| 56-148585 | 11/1981 | Japan . | |
| 59-185690 | 10/1984 | Japan . | |
| 60-199690 | 10/1985 | Japan . | |
| 1283182 | 11/1989 | Japan | B41M 5/00 |

OTHER PUBLICATIONS

English translation of J. Tappi, Paper Pulp Test Method No. 51–87, "Method for Determining the Liquid Absorbability of Paper and Board (Bristow's Method)" (1987).

*Primary Examiner*—Kristine L. Kincaid
*Assistant Examiner*—Eric Frahm
*Attorney, Agent, or Firm*—Fitzpatrick, Cella, Harper & Scinto

[57] ABSTRACT

An ink jet recording method includes a step in which dots of inks of different colors are superposed on a preselected region on a recording medium to form a color image. The recording medium is composed of a liquid-absorbing substrate and a surface layer formed on the substrate. The surface layer is composed mainly of a pigment and a binder. The ink jet recording method is characterized in that dots of at least two inks of different colors are formed in superposition within a time interval of 0.3 seconds. Preferably, the pigment in the surface layer of the recording medium is basic magnesium carbonate.

23 Claims, 1 Drawing Sheet

COLOR INK JET RECORDING METHOD

This application is a continuation of application Ser. No. 07/645,475 filed Jan. 24, 1991, now abandoned.

BACKGROUND OF THE INVENTION

1. Field of the Invention

The present invention relates to an ink jet recording method which enables a multi-color image of a high quality to be recorded on an inexpensive recording medium by inks of different colors, with superior recording characteristics such as ink absorption, coloring (optical density), chromaticity, hue, sharpness and image preservation.

2. Description of the Related Arts

Various recording mediums suitable for ink jet recording have been proposed and used. For instance, Japanese Patent Laid-Open Publication No. 56-148585 discloses a recording medium which is composed of a substrate made of a paper having a small ink absorption characteristic, e.g., a wood-free paper, and an ink absorption layer formed on the substrate and made of a porous inorganic pigment. When this recording-medium is used for recording a color image of high quality and resolution, it is necessary that the ink absorption layer have a considerably large thickness in order to quickly absorb a large quantity of ink. This causes inconveniences such as generation of paper dust, inferior writing characteristic, difficulty in the production of the recording medium, and rise in the production cost.

A recording medium also is known in which, as disclosed in Japanese Patent Laid-Open Publication No. 59-185690 for example, a porous pigment layer is formed on a liquid-absorbing substrate paper which is prepared with a low degree of sizing. This type of recording medium is advantageous in that generation of paper dust is suppressed and the production cost is lowered, while a superior ink absorption characteristic is obtained even with a thin ink acceptor surface layer.

The known recording mediums described above, however, suffer from common disadvantages in that hues are changed or chromaticity is seriously impaired in color mixing regions where ink droplets of different colors are deposited one on the other.

In general, an ink jet recording method is capable of producing color images of high quality and resolution and, hence, there are demands for stable preservation of such images. In particular, the problem of indoor discoloration of a recorded image, peculiar to coated papers, is becoming a matter of great concern.

Hitherto, fastness of images exposed to lights has been recognized as an important factor for preventing discoloration of images, which is caused by exposure of the recorded images to ultraviolet rays and visible rays, regardless of the types of recording mediums such as ordinary PPC (plain-paper copier) papers and wood-free papers, as well as coated paper specifically designed for ink jet recording. Indoor discoloration, however, takes place on images formed on coated papers when such papers are kept from sunlight, but never occurs on images which are recorded on non-coated papers such as PPC papers. Thus, indoor discoloration is a problem peculiar to coated papers and, therefore, has to be discussed separately from light-fastness of images.

SUMMARY OF THE INVENTION

Accordingly, a first object of the present invention is to provide a multi-color ink jet recording method in which a multi-color image is formed by superposing inks of different colors, wherein the method is improved to provide superior characteristics such as ink absorption, coloring characteristic (optical density), chromaticity, hue and saturation, and sharpness, thus ensuring a high quality of the recorded image.

A second object of the present invention is to provide an ink jet recording method which provides, in addition to the above-mentioned superior characteristics, a high degree of preservation stability so as to ensure that the high quality of the recorded image can be maintained stably without degradation.

To these ends, according to one aspect of the present invention, there is provided an ink jet recording method in which dots of inks of different colors are superposed on a preselected region of a recording medium composed of a liquid-absorbing substrate and a surface layer formed on the substrate, the surface layer being composed mainly of a pigment and a binder, to thereby form a color image on the recording medium. The ink jet recording method is characterized in that at least two individual dots of at least two corresponding inks of different colors are formed on the region of the recording medium in superposition within a time interval of 0.3 seconds.

According to another aspect of the invention, there is provided an ink jet recording method in which dots of inks of different colors are superposed on a preselected region of a recording medium composed of a liquid-absorbing substrate and a surface layer formed on the substrate, the surface layer being composed mainly of a pigment and a binder, to thereby form a color image on the recording medium. The ink jet recording method is characterized in that the pigment is basic magnesium carbonate and in that dots of at least two inks of different colors are formed on the region of the recording medium in superposition within a time interval of 0.3 seconds.

According to still another aspect of the present invention, there is provided an ink jet recording method in which dots of inks of different colors are superposed on a preselected region of a recording medium composed of a liquid-absorbing substrate and a surface layer formed on the substrate, the surface layer being composed mainly of a pigment and a binder, and the substrate being partially exposed through the surface layer, to thereby form a color image on the recording medium. That is, dots of corresponding inks are formed on a recording medium that is formed with portions of the substrate being exposed through the surface layer for more efficient absorbtion of the inks. The ink jet recording method is characterized in that dots of at least two inks of different colors are formed on the region of the recording medium in superposition within a time interval of 0.3 seconds.

According to a further aspect of the present invention, there is provided an ink jet recording method in which dots of inks of different colors are superposed on a preselected region of a recording medium composed of a liquid-absorbing substrate and a surface layer formed on the substrate, the surface layer being composed mainly of a pigment and a binder, and the substrate being partially exposed in the surface of the surface region, to thereby form a color image on the recording medium. The ink jet recording method is characterized in that dots of at least two inks of different colors are formed in superposition within a time interval of 0.3 seconds such that the printing density of each color is not smaller than 5.5 $nl/mm^2$.

BRIEF DESCRIPTION OF THE DRAWING

The attached sole

DESCRIPTION OF THE PREFERRED EMBODIMENTS

Figure 1:
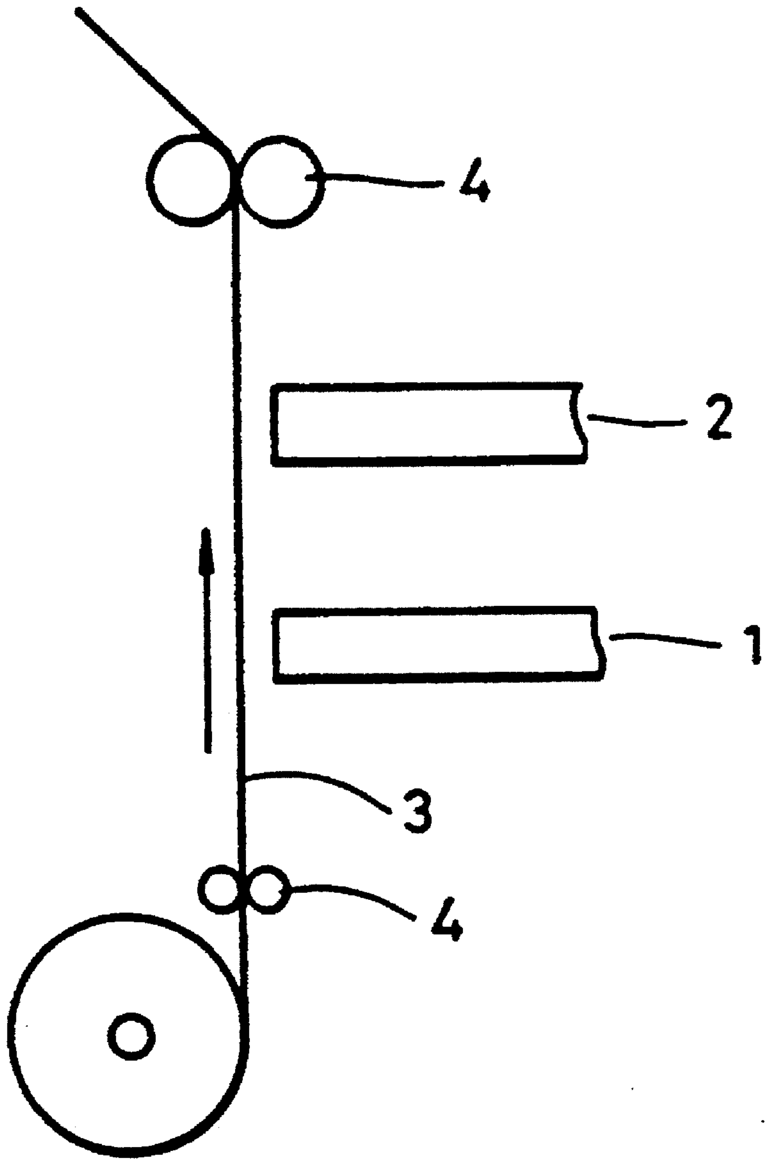
FIG. 1 is a schematic illustration of a recording apparatus used in carrying out the ink jet recording method of the present invention.

Preferred embodiments of the present invention will be described with reference to the drawing.

Referring to FIG. 1, a recording medium 3 is fed by feed rollers 4. Although a rolled sheet is used as the recording medium 3 in the illustrated apparatus, this is only illustrative and cut sheets maybe used as the recording medium 3. During feeding of the recording medium 3, an image is formed on the recording medium with inks which are Jetted from recording heads 1 and 2.

The recording medium 3 used in the present invention has a substrate and a surface layer formed on the substrate. A paper having liquid absorption is preferably used as the substrate. The term "liquid absorption" is used in this specification to mean an ability of the substrate to absorb a predetermined quantity, e.g., 10 ml/m$^2$, of ink. More specifically, the liquid absorption is measured by a liquid absorption test conducted in accordance with Bristow's method which is specified as J.TAPPI paper pulp testing method No. 51. In this specification, mediums which exhibit liquid transfer of 10 ml/m$^2$ or greater in absorption time of 80 msec, when the head box used in the above-mentioned test is charged with 80 μl of ink, are regarded as mediums having liquid absorption.

The substrate with liquid absorption can be prepared from a material which is composed mainly of known wood pulps and containing, as required, fillers and paper-making assistants such as clay, talc and calcium carbonate, a sizing agent, a yield improving agent and a paper strengthening agent.

The surface layer on the substrate is formed mainly from a pigment and a binder. The pigment used in the material of the surface layer may be an ordinary inorganic or organic pigment. From the view point of absorption of dye contained in the ink, however, it is preferred that at least one material selected from the group consisting of silica, aluminum oxide and basic magnesium carbonate be used as a main pigment. In particular, the use of basic magnesium carbonate is preferred when a specifically high image preservation stability is required to prevent indoor discoloration which will be described later.

The binder used in the material of the surface layer may be a known water-soluble polymer selected from polyvinyl alcohol, starch, starch oxide, cationized starch, casein, carboxymethylcellulose, gelatin, and hydroxyethylcellulose, or a known water-dispersion type polymer such as acrylic resins, SBR latexes, and polyvinyl acetate emulsion. One of these binders may be used alone, or two or more may be used in the form of a mixture.

According to the invention, the ratio (P/B) of mixing of the pigment and the binder ranges from $10/1$ to $1/4$, preferably $6/1$ to $1/1$, in terms of weight ratio. When the ratio P/B is smaller than $1/4$, i.e., when the binder content is more than 4 times the pigment content, the ink absorption of the surface layer is reduced to an impractically low level, whereas, when the ratio P/B is greater than $10/1$, i.e., when the pigment is contained in excess of 10 times the binder content, generation of dust from the surface layer is undesirably increased.

The recording medium used in the recording method of the present invention is formed by applying, to the surface of the substrate, an aqueous coating solution containing the pigment, binder and other additives. The application may be conducted by a known method such as roll-coating, blade coating, air-knife coating, gate roll coating or size press coating. After the application, the surface layer is dried in a hot-air oven or by means of a heat drum, whereby the recording medium is obtained.

In order to improve the smoothness and/or strength of the surface layer, a super calender process may be conducted after the drying.

According to the invention, the material of the surface layer can contain, as required, one or more of the additives such as a dye-fixing agent (water-fastness agent), fluorescent brightening agent, surfactant, defoaming agent, pH adjuster, antimold, ultraviolet absorption agent, anti-oxidation agent, dispersing agent, viscosity reducing agent, and so forth. These agents can be selected from known compounds and may be selected suitably according to the characteristics of the recording medium to be obtained.

The cross-section of the coating for forming the surface layer of the recording medium may be of a size such as can be reasonably expressed by "surface layer", typically 0.5 to 20 μm in thickness at the most.

In the recording medium used in the present invention, particularly when used in multi-color printing in which large quantities of inks are applied to the medium, it is preferred that portions of the substrate are exposed through the surface layer, for the purpose of attaining greater ink absorption. For instance, when the substrate is a sheet of paper, it is preferred that parts of the pulp fibers of the substrate exist as a mixture with the pigment on the exposed surface of the surface layer.

The recording method of the present invention can be carried out by using inks which are known per se. For instance, the inks can be prepared by dissolving or dispersing, in suitable solvents, various known water-soluble dyes such as a direct dye, an acidic dye, a basic dye, a reactive dye and an edible dye.

In known inks, these water-soluble dyes are used in amounts of 0.1 to 20 wt%. These amounts of dyes are also applicable to the inks used in the recording method of the present invention.

The solvent suitable for use in aqueous inks employed in the method of the present invention may be water or a mixture solvent composed of water and a water-soluble organic solvent. Among these two types of solvents, a mixture of water and a water-soluble organic solvent, particularly a polyvalent alcohol which suppresses drying of inks, is preferably used. It is also preferred to use a deionized water rather than ordinary water containing various ions.

The content of the water-soluble organic solvent ranges preferably 0 to 95 wt%, more preferably 2 to 80 wt% and most preferably 5 to 50 wt%.

The inks used in the method of the present invention can contain, as required, a surfactant, a viscosity controller, a surface tension adjuster and so so forth, in addition to the components mentioned above.

The ink jet recording method of the present invention is conducted by using the recording medium of the type described above in combination with the inks described hereinbefore, particularly at least two aqueous inks selected from inks of three colors including yellow, magenta and cyan or four colors including black in addition to these three colors. According to the invention, droplets of inks are jetted from respective nozzles towards the recording medium as a target, thus forming a color image having at least two color components. Any known method for jetting inks can be used in the present invention.

Among the known ink jetting methods, the most preferred method is the method which is disclosed in Japanese Laid-Open Publication No. 54-59936 in which ink is jetted from a nozzle by a force generated by an abrupt volumetric change caused by application of heat energy, so as to form a color image of good quality on the recording medium.

The most critical feature of the recording method in accordance with the present invention resides in that deposition of two or more individual ink droplets of different colors is completed within a period of 0.3 seconds, when a color-mixed region is formed by superposing at least two individual droplets of at least two aqueous inks including yellow, magenta or cyan.

The recording medium used in the present invention employs a substrate capable of liquid absorption, in order to attain superior ink absorption and coloring characteristic which are important factors in multi-color recording. The use of a liquid absorbing substrate, however, poses the following problem. Namely, when ink droplets of different colors are superposed on a region of the recording medium so as to develop a mixture color such as red (R), green (G) and blue (Bl), the chromaticity of the dyes tends to be seriously impaired and the hue is often changed due to permeation of the inks into the substrate.

It has been found that the above-mentioned undesirable effect is attributable to the fact that the speed of permeation of the ink of the second color into the substrate is promoted since the medium has already been saturated by the ink of the first color so that a substantial portion of the dye in the second ink does not remain on the surface layer of the recording medium. This problem could be overcome by reducing the printing densities of the inks. A reduction in the printing density, however, undesirably decreases the chromaticity and image density due to a reduction in the absolute amounts of the inks. The shortage in the amounts of inks could be compensated for by an increase in the concentration of the dye in the ink. Any increase in the dye concentration, however, is not preferred because it tends to impair stability of discharge of the ink from the recording head.

In the recording method of the present invention, the printing dot density of each of the four colors of black, yellow, magenta and cyan is 5.5 $nl/mm^2$ or greater. The advantage of the present invention is not appreciable when the invention is applied to recording at a low printing density in which the printing-dot density of each color is below 5.5 $nl/mm^2$.

As explained before, the image density on the recording medium depends on the absolute amounts of the dyes that attach to the medium. The reduction in the printing density can be compensated for by an increase in the concentration of the dye in the ink. The increased dye concentration, however, tends to pose problems such as clogging in the head, with the result that the discharge stability is impaired undesirably. That is, when the printing density is below 5.5 $nl/mm^2$ the image density is generally incompatible with the ink discharging stability.

The term "printing density" is used to mean a value which is obtained by multiplying the mean value of the volume of ink droplet discharged from a recording head with the resolution, i.e., the number of dots of each color which can be formed in a unit area (1 $mm^2$) of the recording medium.

According to the present invention, when ink droplets of two or more corresponding colors are to be superposed one on the other at a point on the recording medium, the deposition of these ink droplets is completed within 0.3 seconds, more preferably within 0.15 seconds, such that the deposition of the subsequent individual droplet or droplets is completed before the permeation of the preceding individual droplet into the substrate is completed. It is therefore possible to suppress reduction in the chromaticity in the color-mixture region on a coated paper having a liquid absorbing substrate.

Conventionally, it has been commonly understood that the deposition of successive ink droplets of different colors is preferably conducted in a comparatively long time interval so as to allow evaporation of the solvent of the first ink droplet before the next droplet is deposited. According to the results of studies, however, it has been found that, under the circumstance where the ink droplets have to be deposited in a short time to meet the demand for higher printing speed, the time interval is preferably made short, contrary to the above-mentioned common understanding.

In the recording method of the present invention, the dots of inks may be superposed in any desired sequence of colors. However, in order to obtain the higher image density in the color-mixture region of-the image, it is preferred that the dots of colors of lower brightness are formed earlier than dots of colors of higher brightness. For instance, when dots of black, cyan, magenta and yellow inks are to be superposed, dots are preferably formed in the mentioned sequence of the colors. The term "time interval" in this specification is used to mean the period between the moment at which the first one of the dots of one of the three colors other than black is formed and the moment at which the last dot of one of these three colors is formed. For instance, the "time interval" means the length of time from the moment at which an individual cyan dot is formed until the moment at which the individual yellow dot is formed, when the dots of cyan, magenta and yellow are formed in the mentioned sequence.

The time interval is determined in accordance with factors such as the driving frequency of each recording head, dot pitch (number of dots printable in a unit length), and the distances between the recording heads for inks of different colors. For instance, in the described case, the time interval is determined by dividing the spacing between the cyan head and the yellow head by the velocity of relative movement between the heads and the recording medium measured in the direction of the array of the heads.

A description will now be given of the feature of the present invention which is directed to the second object, i.e., realization of excellent preservation stability against indoor discoloration, besides the basic requirements for ink absorption, coloring characteristic, chromaticity and hue.

It has been found that the indoor discoloration of the recorded image is attributable to oxidation decomposition of the dyes in the inks. In the case of a coated paper on which an image is to be formed, the chance of oxidation of dyes in contact with air and, hence, the tendency for indoor discoloration are large when the specific area of the pigment (expressed as area/unit weight, such as $m^2/g$) is large in the coat layer, i.e., the surface layer or acceptor layer in the recording medium used in the invention.

This problem would be overcome by using pigments having a small specific area. The use of a known pigment with a small specific area, however, poses a problem in that the trapping of dyes in the surface region of the surface layer is reduced due to insufficient absorption of the dyes, with the result that the image density is lowered correspondingly.

Thus, the stability of image quality against indoor discoloration is generally incompatible with the density and sharpness of the image. It has, however, been found that high stability of an image during long preservation periods can be attained without causing any substantial reduction in the density and sharpness of the image, by using a specific pigment in the surface layer, in particular basic magnesium carbonate.

Basic magnesium carbonate particles are known per se and can be produced by, for example, dispersing magnesium oxide in water to form a slurry of magnesium hydroxide and then blowing carbon dioxide gas into the slurry thereby carbonating the slurry. The slurry, however, need not always be fully carbonated. Namely, the basic magnesium carbonate used in the present invention may contain magnesium oxide and/or magnesium hydroxide.

Particles of basic magnesium carbonate, in comparison with conventionally used paper filler materials such as silica, calcium carbonate, kaolin or the like, can effect sufficient coloring of the dyes even when the specific area is comparatively small.

The basic magnesium oxide particles preferably have a mean particle size of 0.1 to 20 μm, more preferably 0.1 to 12 μm. A too large mean particle size undesirably impairs the quality due to too heavy blotting of the printed dots and/or feathering of the image.

Basic magnesium carbonate has two major advantageous features over other inorganic pigments having equivalent specific surface areas such as silica, alumina or the like, namely, an unparalleled prevention of indoor discoloration and excellent water absorption due to its specific petal-like shaped grains.

The reason why basic magnesium carbonate exhibits a greater effect in suppressing indoor discoloration has not been theoretically proven. Nevertheless, a high image stability, compared with that offered by ordinary printing can be attained even in an ink jet printing method, by using particles of basic magnesium carbonate in the surface layer of the recording medium.

The ink jet recording method of the present invention, as well as its advantages, will be more fully understood from the following description of Examples and Comparison Examples. In the following description, the contents of components are expressed in terms of weight percents (wt %) or weight parts unless otherwise specified.

Example (Preparation of Recording Medium)

A substrate material was prepared which had a basis weight of 80 g/m$^2$, thickness of 100 μm, and ink absorption of 20 ml/m$^2$ as measured by Bristow's method. The material contained, as a filler, 7.0 wt% of calcium carbonate on the ash-content-basis as specified in JIS-P-8128.

Recording medium samples 1 to 4 were produced by applying the following coating solutions to different pieces of the above-mentioned substrate by means of a bar coater in an amount of 7 g/m$^2$ in dried state, with a maximum thickness of 15 μm, followed by a 5-minute drying at 110° C.

| | | |
|---|---|---|
| Recording medium 1 | | |
| Basic magnesium carbonate particles (type S, produced by Ube Kagaku Kabushiki Kaisha, mean particle size 16 μm, BET specific area 46 m$^2$/g) | | 40 parts |
| Polyvinyl alcohol (PVA-117, produced by Kuraray Co., Ltd., saponification degree 98%, polymerization degree 1,700) | | 40 parts |
| Monoallylamine/dimethyldiallylammoniumchloride copolymer (Danfix 5000, produced by Nitto Boseki Co., Ltd) | solid content | 20 parts |
| Water | | 900 parts |
| Recording medium 2 | | |
| Basic magnesium carbonate particles (AM-50. produced by Asahi Glass Co., Ltd., mean particle size 9 μm, BET specific area 32 m$^2$/g) | | 50 parts |
| Polyvinyl alcohol (PVA-117, produced by Kuraray Co., Ltd.) | | 30 parts |
| Polyallylamine (PAA-10L, produced by Nitto Boseki Co., Ltd.) | solid content | 20 parts |
| Water | | 900 parts |
| Recording medium 3 | | |
| Fine silica powder (SYLOID 620, produced by Fuji Davison Co., Ltd., mean particle size 12.0 μm, BET specific area 300 m$^2$/g) | | 100 parts |
| Polyvinyl alcohol (PVA-117, produced by Kuraray Co., Ltd.) | | 30 parts |
| Polydimethyldiallylammoniumchloride (PAS-A-120L, produced by Nitto Boseki Co., Ltd.) | solid content | 20 parts |
| Water | | 900 parts |
| Recording medium 4 | | |
| Fine alumina (Aerodyl aluminum oxide-C, produced by Degsa, mean particle size 0.02 μm, BET specific area 100 m$^2$/g) | | 50 parts |
| Polyvinyl alcohol (PVA-117, produced by Kuraray Co., Ltd.) | | 30 parts |
| Polyallylamine (PAA-10L, produced by Nitto Bosiki Co., Ltd.) | solid content | 5 parts |
| Water | | 900 parts |

The recording medium Samples Nos. 1 to 4 were subjected to a test recording operation conducted on an ink jet printer having four ink jet heads for yellow, magenta, cyan and black inks, each head having a nozzle matrix composed of 128 nozzles arranged at a pitch of 15.7 nozzles per 1 mm and constructed to jet droplets of ink by the effect of heat energy applied to the head. The compositions of the inks used in the test are shown below.

| Ink compositions | |
|---|---|
| Dye | 4 parts |
| Diethylene glycol | 35 parts |
| Water | 61 parts |

Dyes

Yellow: C.I. direct yellow 86

Magenta: C. I. acid red 35

Cyan : C.I. direct blue 199

Black : C.I. food black

The test results were evaluated on the following items.

(1) Image density

The image density of black color in an image painted by the above-mentioned printer was evaluated by using a Macbeth densitometer RD-918.

(2) Image preservation stability

Prints used in the evaluation (1) were bonded to the outer surface of a north-oriented window of an office and then shelved for 3 months. The difference ($\Delta E^*$) between the chromaticity obtained immediately after the printing and the chromaticity observed after the shelving was measured for each sample and the results of measurement are shown in Table 1. Chromaticity was measured with a color analyzer CA-35 (Murakami Shikisai Kagaku K. K.). It was confirmed that the prints during shelving were never exposed to direct sunlight nor subjected to rain but were held in contact with naturally ventilated air.

TABLE 1

| Recording medium | Image density | Image preservation stability |
|---|---|---|
| 1 | 1.45 | $\Delta E^*$ 1.6 |
| 2 | 1.42 | $\Delta E^*$ 1.1 |
| 3 | 1.44 | $\Delta E^*$ 35.4 |
| 4 | 1.46 | $\Delta E^*$ 11.3 |

Example Nos. 1 to 8 and Comparison Examples Nos. 1 to 4

An ink jet printer having two bubble jet recording heads 1 and 2 as schematically shown in FIG. 1 was prepared. Each recording head had a matrix of 128 nozzles arranged at a pitch of 15.7 nozzles per 1 mm. These recording heads were spaced from each other in the direction perpendicular to the axes of these nozzles. Test recording was conducted on different recording mediums, using the heads 1 and 2 for a cyan ink and for a magenta ink, respectively. The mean droplet volume discharged from the heads 1 and 2 were respectively 32 pl and 34 pl. The printing densities obtained with the heads 1 and 2 were respectively 7.9 nl/mm$^2$ and 8.4 nl/mm$^2$.

During the recording, the recording medium was advanced in the direction of the arrow in FIG. 1.

The spacing between the head 1 and the head 2, discharge frequency of the heads 1 and 2 and the feed velocity of the recording medium were varied as shown in Table 2 so as to set the time interval of discharge of successive dots as shown in the same table, without causing any change in the printing density.

The recording characteristics were evaluated in terms of hue and chromaticity of a region which was printed in blue (Bl) by the aforementioned printer, as measured with a color analyzer CA-35 (produced by Murakami Shikisai Kagaku Kabushiki Kaisha). The results are shown in Table 3. The printing was conducted with the cyan ink and the magenta ink which were-mentioned before.

Example 9

A test recording was conducted on the recording medium Sample No. 1 by using a full-color ink jet printer having four bubble jet recording heads of the same type as those used in the test described before. The test printing was conducted using black, cyan, magenta and yellow inks of the compositions described before, The recording heads for black, cyan, magenta and yellow colors were arranged in the mentioned order from the right to the left and the printing was conducted in accordance with the mentioned sequence of colors. The mean droplet volume discharged from the black, yellow, magenta and cyan heads were measured to be 8.4 nl/mm$^2$, 8.2 nl/mm$^2$, 8.4 nl/mm$^2$ and 7.9 in terms of the printing density. Test printing was conducted a plurality of times, by changing the spacings of the recording heads so as to vary the time interval between the printing of the

TABLE 2

| | Discharge frequency (KHz) | Feed velocity (mm/sec) | Head spacing (mm) | Time interval (sec) | Recording medium type |
|---|---|---|---|---|---|
| Example 1 | 4.0 | 250 | 25 | 0.1 | 1 |
| Example 2 | 2.0 | 125 | 37.5 | 0.3 | 1 |
| Comparison Example 1 | 1.2 | 75 | 37.5 | 0.5 | 1 |
| Comparison Example 2 | 1.2 | 75 | 52.5 | 0.7 | 1 |
| Example 3 | 4.0 | 250 | 25 | 0.1 | 2 |
| Example 4 | 2.0 | 125 | 37.5 | 0.3 | 2 |
| Comparison Example 3 | 1.2 | 75 | 37.5 | 0.5 | 2 |
| Comparison Example 4 | 1.2 | 75 | 52.5 | 0.7 | 2 |
| Example 5 | 4.0 | 250 | 25 | 0.1 | 3 |
| Example 6 | 2.0 | 125 | 37.5 | 0.3 | 3 |
| Example 7 | 4.0 | 250 | 25 | 0.1 | 4 |
| Example 8 | 2.0 | 125 | 37.5 | 0.3 | 4 |

TABLE 3

| | Hue | Saturation |
|---|---|---|
| Example 1 | 305 | 50 |
| Example 2 | 302 | 45 |
| Comparison Example 1 | 300 | 41 |
| Comparison Example 2 | 300 | 40 |
| Example 3 | 303 | 47 |
| Example 4 | 300 | 42 |
| Comparison Example 3 | 298 | 38 |
| Comparison Example 4 | 297 | 37 |
| Example 5 | 305 | 48 |

TABLE 3-continued

| | Hue | Saturation |
|---|---|---|
| Example 6 | 304 | 46 |
| Example 7 | 305 | 48 |
| Example 8 | 304 | 46 |

cyan dot and the printing of the yellow dot to 0.1 seconds, 0.3 seconds and 0.5 seconds. An image of high quality with a high level of sharpness was obtained when the printing was conducted at the time interval of 0.1 seconds. In the case of the time interval of 0.3 seconds, however, a slight reduction in the image density at the region where two colors are superposed was exhibited, resulting in a rather insufficient depth of the image. When the printing was conducted at the 0.5 second interval, the image was rather white and obscure.

As will be understood from the foregoing description, the present invention provides a color ink jet recording method which makes use of a recording medium composed of a liquid absorbing substrate and a surface layer composed of a pigment and a binder, wherein, when dots of two or more inks of different colors are to be superposed at a preselected region on the recording medium, these dots are sequentially formed within a specified time interval, whereby a color image of a high quality is formed with good ink absorption and coloring characteristics and high levels of optical density and sharpness.

Furthermore, when basic magnesium carbonate is used as the pigment contained in the surface layer of the recording medium, a distinguished image preservation stability is obtained in addition to the above-mentioned superior recording characteristics.

What is claimed is:

1. An ink jet recording method for forming a color image on a recording medium, said method comprising the steps of:

providing a recording medium composed of a liquid-absorbing substrate and a surface layer formed on the substrate, the surface layer being composed mainly of a pigment and a binder; and superposing individual dots of corresponding inks of different colors on a preselected region on a recording medium, so that at least two individual dots of at least two corresponding inks of different colors are formed on the region of the recording medium within a time interval of 0.3 seconds.

2. An ink jet recording method according to claim 1, wherein portions of the substrate are exposed through the surface layer of the recording medium.

3. An ink jet recording method according to claim 1, wherein the pigment in the surface layer of the recording medium is at least one selected from the group consisting of silica, aluminum oxide and basic magnesium carbonate.

4. An ink jet recording method according to claim 1, wherein the at least two individual dots of at least two corresponding inks of different colors are formed within a time interval of 0.15 seconds.

5. An ink jet recording method according to claim 1, wherein recording heads having nozzles corresponding to the inks of different colors are used and the individual dots of the inks are formed by jetting the inks from the nozzles of the corresponding recording heads by an effect of an application of heat energy.

6. An ink jet recording method according to claim 1, wherein the inks include aqueous inks of yellow, magenta and cyan colors or inks of yellow, magenta, cyan and black colors.

7. An ink jet recording method according to claim 1, wherein printing densities of each color of ink are not less than 5.5 $nl/mm^2$.

8. An ink jet recording method for forming a color image on a recording medium, said method comprising the steps of:

providing a recording medium composed of a liquid-absorbing substrate and a surface layer formed on the substrate, the surface layer being composed mainly of a basic magnesium carbonate pigment and a binder; and superposing individual dots of corresponding inks of different colors on a preselected region of the recording medium, so that at least two individual dots of at least two corresponding inks of different colors are formed on the region of the recording medium within a time interval of 0.3 seconds.

9. An ink jet recording method according to claim 8, wherein portions of the substrate are exposed through the surface layer of the recording medium.

10. An ink jet recording medium according to claim 8, wherein the at least two individual dots of at least two corresponding inks of different colors are formed within a time interval of 0.15 seconds.

11. An ink jet recording method according to claim 8, wherein recording heads having nozzles corresponding to the inks of different colors are used and the individual dots of the inks are formed by jetting the inks from the nozzles of the corresponding recording heads by an effect of application of heat energy.

12. An ink jet recording method according to claim 8, wherein the inks include aqueous inks of yellow, magenta and cyan colors or inks of yellow, magenta, cyan and black colors.

13. An ink jet recording method according to claim 8, wherein printing densities of each color of ink are not less than 5.5 $nl/mm^2$.

14. An ink jet recording method for forming a color image on a recording medium, said method comprising the steps of:

providing a recording medium composed of a liquid-absorbing substrate and a surface layer formed on the substrate, the surface layer being composed mainly of a pigment and a binder and portions of the substrate being exposed through the surface layer of the recording medium; and superposing individual dots of corresponding inks of different colors on a preselected region of the recording medium, so that at least two individual dots of at least two corresponding inks of different colors are formed on the region of the recording medium within a time interval of 0.3 seconds.

15. An ink jet recording method according to claim 14, wherein the pigment used in the surface layer of the recording medium is at least one selected from the group consisting of silica, aluminum oxide and basic magnesium carbonate.

16. An ink jet recording method according to claim 14, wherein the at least two individual dots of at least two corresponding inks of different colors are formed within a time interval of 0.15 seconds.

17. An ink jet recording method according to claim 14, wherein recording heads having nozzles corresponding to the inks of different colors are used and the individual dots of the inks are formed by jetting the inks from the nozzles of the corresponding recording heads by an effect of an application of heat energy.

18. An ink jet recording method according to claim 14, wherein the inks include aqueous inks of yellow, magenta and cyan colors or inks of yellow, magenta, cyan and black colors.

19. An ink jet recording method according to claim 14, wherein printing densities of each color of ink are not less than 5.5 $nl/mm^2$.

20. An ink jet recording method for forming a color image on a recording medium, said method comprising the steps of:

providing a recording medium being composed of a liquid-absorbing substrate and a surface layer formed on the substrate, the surface layer being composed mainly of a pigment and a binder and portions of the substrate being exposed through the surface layer of the recording medium; and superposing individual dots of corresponding inks of different colors on a preselected region of the recording medium, so that at least two individual dots of at least two corresponding inks of different colors are formed within a time interval of 0.3 seconds, wherein the printing densities of each color are not less than 5.5 $nl/mm^2$.

21. An ink jet recording method according to claim 20, wherein the at least two individual dots of at least two corresponding inks of different colors are formed within a time interval of 0.15 seconds.

22. An ink jet recording method according to claim 20, wherein recording heads having nozzles corresponding to the inks of different colors are used and the individual dots of the inks are formed by jetting the inks from the nozzles of the corresponding recording heads by an effect of application of heat energy.

23. An ink jet recording method according to claim 20, wherein the inks include aqueous inks of yellow, magenta and cyan colors or inks of yellow, magenta, cyan and black colors.

* * * * *

UNITED STATES PATENT AND TRADEMARK OFFICE

CERTIFICATE OF CORRECTION

PATENT NO. : 5,459,502

DATED : October 17, 1995

INVENTOR(S) : Mamoru SAKAKI, et al.

It is certified that error appears in the above-indentified patent and that said Letters Patent is hereby corrected as shown below:

On the title page

AT [56] References Cited - FOREIGN PATENT DOCUMENTS:

"1283182 11/1989 Japan" should read --1-283182 11/1989 Japan--.

COLUMN 3:

Line 10, "Jetted" should read --jetted--.

COLUMN 6:

Line 19, "of-the" should read --of the--.

COLUMN 10:

Line 15, "were-mentioned" should read --were mentioned--.

Signed and Sealed this

Thirteenth Day of February, 1996

Attest:

BRUCE LEHMAN

*Attesting Officer* *Commissioner of Patents and Trademarks*